US012156012B2

(12) United States Patent
Bruhn

(10) Patent No.: US 12,156,012 B2
(45) Date of Patent: Nov. 26, 2024

(54) REPRESENTING SPATIAL AUDIO BY MEANS OF AN AUDIO SIGNAL AND ASSOCIATED METADATA

(71) Applicants: DOLBY INTERNATIONAL AB, Dublin (IE); DOLBY LABORATORIES LICENSING CORPORATION, San Francisco, CA (US)

(72) Inventor: Stefan Bruhn, Sollentuna (SE)

(73) Assignees: DOLBY INTERNATIONAL AB, Dublin (IE); DOLBY LABORATORIES LICENSING CORPORATION, San Francisco, CA (US)

( * ) Notice: Subject to any disclaimer, the term of this patent is extended or adjusted under 35 U.S.C. 154(b) by 0 days.

(21) Appl. No.: 18/465,636

(22) Filed: Sep. 12, 2023

(65) Prior Publication Data

US 2024/0114307 A1 Apr. 4, 2024

Related U.S. Application Data

(63) Continuation of application No. 17/293,463, filed as application No. PCT/US2019/060862 on Nov. 12, 2019, now Pat. No. 11,765,536.

(Continued)

(51) Int. Cl.
*H04S 3/02* (2006.01)

(52) U.S. Cl.
CPC ............ *H04S 3/02* (2013.01); *H04S 2400/03* (2013.01)

(58) Field of Classification Search
CPC .... H04S 3/02; H04S 2400/03; H04S 2400/15; H04S 2420/03; H04S 2420/11;

(Continued)

(56) References Cited

U.S. PATENT DOCUMENTS 5,521,981 A 5/1996 Gehring
5,930,451 A 7/1999 Ejiri (Continued)

FOREIGN PATENT DOCUMENTS

CN 105792086 A 7/2016
GB 2366975 A 3/2002

(Continued)

OTHER PUBLICATIONS

Ariza, O. et al."Analysis of Proximity-Based Multimodal Feedback for 3D Selection in Immersive Virtual Environments" IEEE Conference on Virtual Reality and 3D User Interfaces, Mar. 2018, pp. 327-334.

(Continued)

*Primary Examiner* — Paul Kim

(57) ABSTRACT

There is provided encoding and decoding methods for representing spatial audio that is a combination of directional sound and diffuse sound. An exemplary encoding method includes inter alia creating a single- or multi-channel downmix audio signal by downmixing input audio signals from a plurality of microphones in an audio capture unit capturing the spatial audio; determining first metadata parameters associated with the downmix audio signal, wherein the first metadata parameters are indicative of one or more of: a relative time delay value, a gain value, and a phase value associated with each input audio signal; and combining the created downmix audio signal and the first metadata parameters into a representation of the spatial audio.

8 Claims, 5 Drawing Sheets

TABLE 1B

| CH BIT VALUE | BIT VALUE | DECODED VALUE | ADDITIONAL DESCRIPTION |
|---|---|---|---|
| 00 | 00 | MONO | |
| | 01 | STEREO DOWNMIX | THE DOWNMIX IS GENERATED FROM A L/R STEREO SIGNAL. DOWNMIX RELATED SIGNAL DEPENDENT METADATA IS SIGNALED IN THE DOWNMIX METADATA FIELD. |
| | 10 | PLANAR FOA DOWNMIX | THE DOWNMIX IS GENERATED FROM PLANAR FOA COMPONENT SIGNALS. DOWNMIX RELATED SIGNAL DEPENDENT METADATA IS SIGNALED IN THE DOWNMIX METADATA FIELD. |
| | 11 | FOA DOWNMIX | THE DOWNMIX IS GENERATED FROM AN FOA COMPONENT SIGNALS. DOWNMIX RELATED SIGNAL DEPENDENT METADATA IS SIGNALED IN THE DOWNMIX METADATA FIELD. |
| 01 | 00 | L/R STEREO | |
| | 01 | BINAURAL | |
| | 10 | 2 MONO (MIXED) | THE TWO SIGNALS ARE MIXED IN SYNTHESIS. PROVISION FOR USER INPUT AT RENDERER. |
| | 11 | 2 MONO (ALTERNATIVE) | THE TWO SIGNALS ARE ALTERNATIVES, AND ONLY ONE SIGNAL IS USED IN SYNTHESIS. DEFAULT TO BE USED IS THE FIRST OF THE TWO MONO SIGNALS. PROVISION FOR USER INPUT AT RENDERER. |

Related U.S. Application Data

(60) Provisional application No. 62/926,719, filed on Oct. 28, 2019, provisional application No. 62/828,038, filed on Apr. 2, 2019, provisional application No. 62/795,248, filed on Jan. 22, 2019, provisional application No. 62/760,262, filed on Nov. 13, 2018.

(58) Field of Classification Search
CPC . H04S 2400/01; G10L 19/167; G10L 19/008; H04R 2499/11; H04R 1/406; H04R 3/005; H04R 5/00
USPC .................................................. 381/20–23, 1
See application file for complete search history.

(56) References Cited

U.S. PATENT DOCUMENTS

| | | | | |
|---|---|---|---|---|
| 7,450,727 | B2 * | 11/2008 | Griesinger | H04S 3/02 381/119 |
| 8,712,059 | B2 * | 4/2014 | Del Galdo | G10L 19/008 381/23 |
| 9,349,118 | B2 | 5/2016 | Chavez | |
| 9,357,323 | B2 | 5/2016 | Ramabadran | |
| 9,510,127 | B2 | 11/2016 | Squires | |
| 9,521,170 | B2 | 12/2016 | Bader-Natal | |
| 9,728,181 | B2 | 8/2017 | Jot | |
| 9,755,847 | B2 | 9/2017 | Clavel | |
| 9,774,975 | B2 | 9/2017 | Krueger | |
| 9,774,976 | B1 | 9/2017 | Baumgarte | |
| 9,820,037 | B2 | 11/2017 | Virolainen | |
| 9,838,822 | B2 | 12/2017 | Boehm | |
| 9,854,375 | B2 | 12/2017 | Stockhammer | |
| 9,933,989 | B2 | 4/2018 | Tsingos | |
| 9,955,278 | B2 | 4/2018 | Fersch | |
| 9,986,363 | B2 | 5/2018 | Bošnjak et al. | |
| 10,057,707 | B2 | 8/2018 | Cartwright | |
| 10,062,208 | B2 | 8/2018 | Ziman | |
| 10,068,577 | B2 | 9/2018 | Melkote | |
| 10,187,739 | B2 | 1/2019 | Goodwin | |
| 10,210,907 | B2 | 2/2019 | Puri | |
| 10,290,304 | B2 | 5/2019 | Hirvonen | |
| 11,699,451 | B2 * | 7/2023 | McGrath | G10L 19/167 704/500 |
| 11,765,536 | B2 * | 9/2023 | Bruhn | G10L 19/008 381/22 |
| 2004/0135040 | A1 | 7/2004 | Eason | |
| 2005/0147261 | A1 | 7/2005 | Yeh | |
| 2006/0115100 | A1 | 6/2006 | Faller | |
| 2009/0171676 | A1 | 7/2009 | Oh | |
| 2009/0264114 | A1 | 10/2009 | Virolainen | |
| 2009/0299742 | A1 | 12/2009 | Toman | |
| 2009/0325524 | A1 | 12/2009 | Oh | |
| 2010/0008640 | A1 | 1/2010 | Casaccia | |
| 2010/0061558 | A1 | 3/2010 | Faller | |
| 2010/0188568 | A1 | 7/2010 | Abe | |
| 2010/0228554 | A1 | 9/2010 | Beack | |
| 2010/0303265 | A1 | 12/2010 | Porwal | |
| 2010/0332239 | A1 | 12/2010 | Kim | |
| 2011/0208528 | A1 | 8/2011 | Schildbach | |
| 2011/0222694 | A1 * | 9/2011 | Del Galdo | H04S 3/02 381/17 |
| 2012/0070007 | A1 | 3/2012 | Kim | |
| 2012/0082319 | A1 | 4/2012 | Jot | |
| 2012/0114126 | A1 | 5/2012 | Thiergart | |
| 2012/0177204 | A1 | 7/2012 | Hellmuth | |
| 2013/0322640 | A1 | 12/2013 | Dickins | |
| 2014/0226838 | A1 | 8/2014 | Wingate | |
| 2014/0297296 | A1 | 10/2014 | Koppens | |
| 2014/0350944 | A1 | 11/2014 | Jot | |
| 2014/0358567 | A1 | 12/2014 | Koppens | |
| 2014/0376728 | A1 | 12/2014 | Rämö | |
| 2015/0035940 | A1 | 2/2015 | Shapiro | |
| 2015/0142427 | A1 | 5/2015 | Terentiv | |
| 2015/0162012 | A1 | 6/2015 | Kastner | |
| 2015/0194158 | A1 | 7/2015 | Oh | |
| 2015/0208156 | A1 | 7/2015 | Virolainen | |
| 2015/0269951 | A1 | 9/2015 | Kalker | |
| 2015/0332663 | A1 | 11/2015 | Jot | |
| 2015/0356978 | A1 | 12/2015 | Dickins | |
| 2016/0035355 | A1 | 2/2016 | Thesing | |
| 2016/0080880 | A1 | 3/2016 | Goshen | |
| 2016/0111099 | A1 | 4/2016 | Hirvonen | |
| 2016/0150343 | A1 | 5/2016 | Wang | |
| 2016/0167672 | A1 | 6/2016 | Krueger | |
| 2016/0180826 | A1 | 6/2016 | Dickins | |
| 2016/0240204 | A1 | 8/2016 | Kuech | |
| 2016/0255454 | A1 | 9/2016 | Mcgrath | |
| 2016/0345092 | A1 | 11/2016 | Virolainen | |
| 2017/0026650 | A1 | 1/2017 | Mittal | |
| 2017/0098452 | A1 | 4/2017 | Tracey | |
| 2017/0156015 | A1 | 6/2017 | Stockhammer | |
| 2017/0171576 | A1 | 6/2017 | Oh | |
| 2017/0215019 | A1 | 7/2017 | Chen | |
| 2017/0245055 | A1 | 8/2017 | Sun | |
| 2017/0270711 | A1 | 9/2017 | Schoenberg | |
| 2017/0318070 | A1 | 11/2017 | Zaitsev | |
| 2017/0353812 | A1 | 12/2017 | Schaefer | |
| 2018/0047394 | A1 | 2/2018 | Tian | |
| 2018/0077491 | A1 | 3/2018 | Butler | |
| 2018/0090151 | A1 | 3/2018 | Dick | |
| 2018/0098174 | A1 | 4/2018 | Goodwin | |
| 2018/0123813 | A1 | 5/2018 | Milevski | |
| 2018/0139413 | A1 | 5/2018 | Diao | |
| 2018/0192189 | A1 | 7/2018 | Virolainen | |
| 2018/0240470 | A1 | 8/2018 | Wang | |
| 2018/0332421 | A1 | 11/2018 | Torres | |
| 2018/0338213 | A1 | 11/2018 | Lehtiniemi | |
| 2018/0375676 | A1 | 12/2018 | Bader-Natal | |
| 2019/0007783 | A1 | 1/2019 | Magariyachi | |
| 2019/0013028 | A1 | 1/2019 | Atti | |
| 2019/0026936 | A1 | 1/2019 | Gorur Sheshagiri | |
| 2019/0103118 | A1 | 4/2019 | Atti | |
| 2019/0132674 | A1 | 5/2019 | Vilkamo | |
| 2019/0296821 | A1 | 9/2019 | Choi | |
| 2021/0050022 | A1 | 2/2021 | Kjoerling | |
| 2022/0022000 | A1 | 1/2022 | Bruhn | |
| 2023/0209302 | A1 * | 6/2023 | Koppens | H04S 7/307 381/1 |

FOREIGN PATENT DOCUMENTS

| | | | |
|---|---|---|---|
| JP | 2005181391 | A | 7/2005 |
| JP | 2009081861 | A | 4/2009 |
| JP | 2009532735 | A | 9/2009 |
| JP | 2011193164 | A | 9/2011 |
| JP | 2012503792 | A | 2/2012 |
| JP | 2012141633 | A | 7/2012 |
| JP | 2013210501 | A | 10/2013 |
| JP | 2015-529850 | | 10/2015 |
| JP | 2015-531078 | | 10/2015 |
| JP | 2015528926 | A | 10/2015 |
| JP | 2016519788 | A | 7/2016 |
| JP | 2016-525715 | | 8/2016 |
| JP | 2016-530788 | | 9/2016 |
| JP | 2016528542 | A | 9/2016 |
| JP | 2017-515164 | | 6/2017 |
| JP | 2018511070 | A | 4/2018 |
| KR | 20150032734 | A | 3/2015 |
| MX | 06009931 | A | 3/2007 |
| WO | 2005094125 | A1 | 10/2005 |
| WO | 2016142375 | | 3/2015 |
| WO | 2016209098 | A1 | 12/2016 |
| WO | 2017023601 | A1 | 2/2017 |
| WO | 2017140666 | | 8/2017 |
| WO | 2017182714 | A1 | 10/2017 |
| WO | 2018060550 | A1 | 4/2018 |
| WO | 2018091776 | | 5/2018 |
| WO | 2018100232 | A1 | 6/2018 |
| WO | 2018106735 | A1 | 6/2018 |
| WO | 2018226508 | | 12/2018 |
| WO | 2019068638 | | 4/2019 |
| WO | 2019091575 | | 5/2019 |
| WO | 2019097017 | | 5/2019 |

(56) References Cited

FOREIGN PATENT DOCUMENTS

| | | |
|---|---|---|
| WO | 2019105575 | 6/2019 |
| WO | 2019106221 | 6/2019 |
| WO | 2019129350 | 7/2019 |

OTHER PUBLICATIONS

Williams, D., Pooransingh, A., & Saitoo, J. (2017). Efficient music identification using ORB descriptors of the spectrogram image. EURASIP Journal on Audio, Speech, and Music Processing,2017(1). doi: 10.1186/ s13636-017-0114-4.

Gabin, F. et al."5G Multimedia Standardization" Journal of ICT Standardization vol. 6 Issue: Combined Special Issue 1 & 2 Published In: May 2018.

McGrath, D et al."Immersive Audio Coding for Virtual Reality Using a Metadata-assisted Extension of the 3GPP EVS CODEC" ICASSP IEEE International Conference on Acoustics, Speech and Signal Processing, May 2019.

TDOC S4 "Proposal for IVAS MASA Channel Audio Format Parameter" Apr. 8-12, 2019, Newport Beach, CA, USA.

TDOC S4 (18)0087 "On IVAS audio formats for mobile capture devices" Source: Nokia Corporation, Feb. 5-9, 2018, Fukuoka, Japan.

TDOC S4-171221 "IVAS use case of spatial conferencing and related codec requirements" Nov. 13-17, 2017, Albuquerque, NM, USA.

TDOC S4-180143, "Use case specific IVAS design constraints" source: Dolby Laboratories, Inc. Feb. 5-9, 2018 meeting, Fukuoka, Japan.

TDOC S4-180466, "On capture formats for IVAS" Source: Qualcomm Incorporated, Apr. 9-13, 2018, Kista, Sweden.

TDOC S4-180806 "Dolby VRStream audio profile candidate—Description of Bitstream, Decoder, and Renderer plus informative Encoder Description" Source: Dolby Laboratories, Inc. Jul. 9-13, 2018, Rome, Italy.

TDOC S4-191307 IVAS Design Constraints (IVAS-4), TSG SA4#106 meeting, Oct. 21-25, 2019, Busan, Korea.

ETSI TS 103 190-2 "Digital Audio Compression (AC-4) Standard Part 2: Immersive and Personalized Audio" 103 190-2 V1.3.1 (Oct. 2017), pp. 1-230.

ETSI TS 103 420 V1.1.1, Jul. 2016 "Backwards-Compatible Object Audio Carriage Using Enhanced AC-3" pp. 1-68.

Sen, D et al."Efficient Compression and Transportation of Scene-Based Audio for Television Broadcast" Jul. 14, 2016, AES International Conference, pp. 1-8.

Setiawan, p et al."Compressing Higher Order Ambisonics of a Multizone Soundfield" published in Acoustics, Speech and Signal Processing Mar. 2017, pp. 1-5.

Sound Labs, "3D Audio Formats for Virtual Reality" Jun. 29, 2016, pp. 1-7.

Mllemoes, L. et al."Decorrelation for Audio Object Coding" IEEE published in Acoustics, Speech and Signal Processing, Mar. 2017, pp. 706-709.

* cited by examiner

TABLE 1A

| CH BIT VALUE | DECODED VALUE | ADDITIONAL DESCRIPTION |
|---|---|---|
| 00 | 1 CHANNEL | |
| 01 | 2 CHANNELS | |
| 10 | 3 CHANNELS | |
| 11 | 4 CHANNELS | |

FIG. 3A

TABLE 1B

| CH BIT VALUE | BIT VALUE | DECODED VALUE | ADDITIONAL DESCRIPTION |
|---|---|---|---|
| 00 | 00 | MONO | |
| | 01 | STEREO DOWNMIX | THE DOWNMIX IS GENERATED FROM A L/R STEREO SIGNAL. DOWNMIX RELATED SIGNAL DEPENDENT METADATA IS SIGNALED IN THE DOWNMIX METADATA FIELD. |
| | 10 | PLANAR FOA DOWNMIX | THE DOWNMIX IS GENERATED FROM PLANAR FOA COMPONENT SIGNALS. DOWNMIX RELATED SIGNAL DEPENDENT METADATA IS SIGNALED IN THE DOWNMIX METADATA FIELD. |
| | 11 | FOA DOWNMIX | THE DOWNMIX IS GENERATED FROM AN FOA COMPONENT SIGNALS. DOWNMIX RELATED SIGNAL DEPENDENT METADATA IS SIGNALED IN THE DOWNMIX METADATA FIELD. |
| 01 | 00 | L/R STEREO | |
| | 01 | BINAURAL | |
| | 10 | 2 MONO (MIXED) | THE TWO SIGNALS ARE MIXED IN SYNTHESIS. PROVISION FOR USER INPUT AT RENDERER. |
| | 11 | 2 MONO (ALTERNATIVE) | THE TWO SIGNALS ARE ALTERNATIVES, AND ONLY ONE SIGNAL IS USED IN SYNTHESIS. DEFAULT TO BE USED IS THE FIRST OF THE TWO MONO SIGNALS. PROVISION FOR USER INPUT AT RENDERER. |

FIG. 3B

TABLE 2

| | | SET OF DELAY COMPENSATION VALUES | | |
|---|---|---|---|---|
| | | 1 | 2 | 3 |
| MICROPHONE | 1 | ... | ... | ... |
| | 2 | ... | ... | ... |
| | 3 | ... | $B_{ij}$ | ... |
| | 4 | ... | ... | ... |

FIG. 4

TABLE 3

| | | SUB-BAND | | | |
|---|---|---|---|---|---|
| | | 1 | 2 | ○ ○ ○ | 24 |
| SUBFRAME | 1 | ... | ... | ○ ○ ○ | ... |
| | 2 | ... | 2-BIT SELECTOR | ○ ○ ○ | ... |
| | 3 | ... | ... | ○ ○ ○ | ... |
| | 4 | ... | ... | ○ ○ ○ | ... |

FIG. 5

TABLE 4

| MICROPHONE 1 | | SUB-BAND | | | |
|---|---|---|---|---|---|
| | | 1 | 2 | ○ ○ ○ | 24 |
| SUBFRAME | 1 | ... | ... | ○ ○ ○ | ... |
| | 2 | ... | $B_a$ | ○ ○ ○ | ... |
| | 3 | ... | ... | ○ ○ ○ | ... |
| | 4 | ... | ... | ○ ○ ○ | ... |
| **MICROPHONE 2** | | **SUB-BAND** | | | |
| | | 1 | 2 | ○ ○ ○ | 24 |
| SUBFRAME | 1 | ... | ... | ○ ○ ○ | ... |
| | 2 | ... | $B_a$ | ○ ○ ○ | ... |
| | 3 | ... | ... | ○ ○ ○ | ... |
| | 4 | ... | ... | ○ ○ ○ | ... |
| **MICROPHONE 3** | | **SUB-BAND** | | | |
| | | 1 | 2 | ○ ○ ○ | 24 |
| SUBFRAME | 1 | ... | ... | ○ ○ ○ | ... |
| | 2 | ... | $B_a$ | ○ ○ ○ | ... |
| | 3 | ... | ... | ○ ○ ○ | ... |
| | 4 | ... | ... | ○ ○ ○ | ... |
| **MICROPHONE 4** | | **SUB-BAND** | | | |
| | | 1 | 2 | ○ ○ ○ | 24 |
| SUBFRAME | 1 | ... | ... | ○ ○ ○ | ... |
| | 2 | ... | $B_a$ | ○ ○ ○ | ... |
| | 3 | ... | ... | ○ ○ ○ | ... |
| | 4 | ... | ... | ○ ○ ○ | ... |

REPRESENTING SPATIAL AUDIO BY MEANS OF AN AUDIO SIGNAL AND ASSOCIATED METADATA

CROSS-REFERENCE TO RELATED APPLICATIONS

This application claims priority to U.S. patent application Ser. No. 17/293,463 filed May 12, 2021, which is a U.S. National Stage application under U.S.C. 371 of International Application No. PCT/US2019/060862 filed Nov. 12, 2019, which claims priority to U.S. Provisional Patent Application No. 62/760,262 filed Nov. 13, 2018, U.S. Provisional Patent Application No. 62/795,248 filed Jan. 22, 2019; U.S. Provisional Patent Application No. 62/828,038 filed Apr. 2, 2019; and U.S. Provisional Patent Application No. 62/926,719 filed Oct. 28, 2019, each of which is hereby incorporated by reference.

TECHNICAL FIELD

The disclosure herein generally relates to coding of an audio scene comprising audio objects. In particular, it relates to methods, systems, computer program products and data formats for representing spatial audio, and an associated encoder, decoder and renderer for encoding, decoding and rendering spatial audio.

BACKGROUND

The introduction of 4G/5G high-speed wireless access to telecommunications networks, combined with the availability of increasingly powerful hardware platforms, have provided a foundation for advanced communications and multimedia services to be deployed more quickly and easily than ever before.

The Third Generation Partnership Project (3GPP) Enhanced Voice Services (EVS) codec has delivered a highly significant improvement in user experience with the introduction of super-wideband (SWB) and full-band (FB) speech and audio coding, together with improved packet loss resiliency. However, extended audio bandwidth is just one of the dimensions required for a truly immersive experience. Support beyond the mono and multi-mono currently offered by EVS is ideally required to immerse the user in a convincing virtual world in a resource-efficient manner.

In addition, the currently specified audio codecs in 3GPP provide suitable quality and compression for stereo content but lack the conversational features (e.g. sufficiently low latency) needed for conversational voice and teleconferencing. These coders also lack multi-channel functionality that is necessary for immersive services, such as live streaming, virtual reality (VR) and immersive teleconferencing.

An extension to the EVS codec has been proposed for Immersive Voice and Audio Services (IVAS) to fill this technology gap and to address the increasing demand for rich multimedia services. In addition, teleconferencing applications over 4G/5G will benefit from an IVAS codec used as an improved conversational coder supporting multi-stream coding (e.g. channel, object and scene-based audio). Use cases for this next generation codec include, but are not limited to, conversational voice, multi-stream teleconferencing, VR conversational and user generated live and non-live content streaming.

While the goal is to develop a single codec with attractive features and performance (e.g. excellent audio quality, low delay, spatial audio coding support, appropriate range of bit rates, high-quality error resiliency, practical implementation complexity), there is currently no finalized agreement on the audio input format of the IVAS codec. Metadata Assisted Spatial Audio Format (MASA) has been proposed as one possible audio input format. However, conventional MASA parameters make certain idealistic assumptions, such as audio capture being done in a single point. However, in a real world scenario, where a mobile phone or tablet is used as an audio capturing device, such an assumption of sound capture in a single point may not hold. Rather, depending on form factor of the particular device, the various mics of the device may be located some distance apart and the different captured microphone signals may not be fully time-aligned. This is particularly true when consideration is also made to how the source of the audio may move around in space.

Another underlying assumption of the MASA format is that all microphone channels are provided at equal level and that there are no differences in frequency and phase response among them. Again, in a real world scenario, microphone channels may have different direction-dependent frequency and phase characteristics, which may also be time-variant. One could assume, for example, that the audio capturing device is temporarily held such that one of the microphones is occluded or that there is some object in the vicinity of the phone that causes reflections or diffractions of the arriving sound waves. Thus, there are many additional factors to take into account when determining what audio format would be suitable in conjunction with a codec such as the IVAS codec.

BRIEF DESCRIPTION OF THE DRAWINGS

Example embodiments will now be described with reference to the accompanying drawings, on which:

FIG. 3A shows a table (Table 1A) of how a channel bit value parameter indicates how many channels are used for the MASA format, according to exemplary embodiments.

FIG. 3B shows a table (Table 1B) of a metadata structure that can be used to represent Planar FOA and FOA capture with downmix into two MASA channels, according to exemplary embodiments;

FIG. 4 shows a table (Table 2) of delay compensation values for each microphone and per TF tile, according to exemplary embodiments;

FIG. 5 shows a table (Table 3) of a metadata structure that can be used to indicate which set of compensation values applies to which TF tile, according to exemplary embodiments;

All the figures are schematic and generally only show parts which are necessary in order to elucidate the disclosure, whereas other parts may be omitted or merely suggested. Unless otherwise indicated, like reference numerals refer to like parts in different figures.

DETAILED DESCRIPTION

Figure 1:
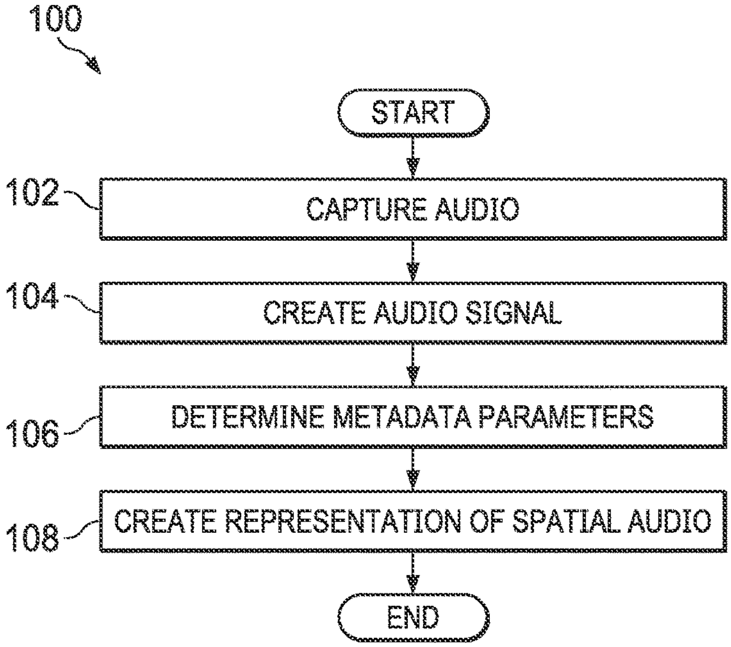
FIG. 1 is a flowchart of a method for representing spatial audio according to exemplary embodiments.

In view of the above it is thus an object to provide methods, systems and computer program products and a data format for improved representation of spatial audio. An encoder, a decoder and a renderer for spatial audio are also provided.

I. Overview—Spatial Audio Representation

According to a first aspect, there is provided a method, a system, a computer program product and a data format for representing spatial audio.

According to exemplary embodiments there is provided a method for representing spatial audio, the spatial audio being a combination of directional sound and diffuse sound, comprising:

- creating a single- or multi-channel downmix audio signal by downmixing input audio signals from a plurality of microphones in an audio capture unit capturing the spatial audio;
- determining first metadata parameters associated with the downmix audio signal, wherein the first metadata parameters are indicative of one or more of: a relative time delay value, a gain value, and a phase value associated with each input audio signal; and
- combining the created downmix audio signal and the first metadata parameters into a representation of the spatial audio.

With the above arrangement, an improved representation of the spatial audio may be achieved, taking into account different properties and/or spatial positions of the plurality of microphones. Moreover, using the metadata in the subsequent processing stages of encoding, decoding or rendering may contribute to faithfully representing and reconstructing the captured audio while representing the audio in a bit rate efficient coded form.

According to exemplary embodiments, combining the created downmix audio signal and the first metadata parameters into a representation of the spatial audio may further comprise including second metadata parameters in the representation of the spatial audio, the second metadata parameters being indicative of a downmix configuration for the input audio signals.

This is advantageous in that it allows for reconstructing (e.g., through an upmixing operation) the input audio signals at a decoder. Moreover, by providing the second metadata, further downmixing may be performed by a separate unit before encoding the representation of the spatial audio to a bit stream.

According to exemplary embodiments the first metadata parameters may be determined for one or more frequency bands of the microphone input audio signals.

This is advantageous in that it allows for individually adapted delay, gain and/or phase adjustment parameters, e.g., considering the different frequency responses for different frequency bands of the microphone signals.

According to exemplary embodiments the downmixing to create a single- or multi-channel downmix audio signal x may be described by:

$$x=D\cdot m$$

wherein:

- D is a downmix matrix containing downmix coefficients defining weights for each input audio signal from the plurality of microphones, and
- m is a matrix representing the input audio signals from the plurality of microphones.

According to exemplary embodiments the downmix coefficients may be chosen to select the input audio signal of the microphone currently having the best signal to noise ratio with respect to the directional sound, and to discard signal input audio signals from any other microphones.

This is advantageous in that it allows for achieving a good quality representation of the spatial audio with a reduced computation complexity at the audio capture unit. In this embodiment, only one input audio signal is chosen to represent the spatial audio in a specific audio frame and/or time frequency tile. Consequently, the computational complexity for the downmixing operation is reduced.

According to exemplary embodiments the selection may be determined on a per Time-Frequency (TF) tile basis.

This is advantageous in that it allows for an improved downmixing operation, e.g. considering the different frequency responses for different frequency bands of the microphone signals.

According to exemplary embodiments the selection may be made for a particular audio frame.

Advantageously, this allows for adaptations with regards to time varying microphone capture signals, and in turn to improved audio quality.

According to exemplary embodiments the downmix coefficients may be chosen to maximize the signal to noise ratio with respect to the directional sound, when combining the input audio signals from the different microphones This is advantageous in that it allows for an improved quality of the downmix due to attenuation of unwanted signal components that do not stem from the directional sources.

According to exemplary embodiments the maximizing may be done for a particular frequency band.

According to exemplary embodiments the maximizing may be done for a particular audio frame.

According to exemplary embodiments determining first metadata parameters may include analyzing one or more of: delay, gain and phase characteristics of the input audio signals from the plurality microphones.

According to exemplary embodiments the first metadata parameters may be determined on a per Time-Frequency (TF) tile basis.

According to exemplary embodiments at least a portion of the downmixing may occur in the audio capture unit.

According to exemplary embodiments at least a portion of the downmixing may occur in an encoder.

According to exemplary embodiments, when detecting more than one source of directional sound, first metadata may be determined for each source.

According to exemplary embodiments the representation of the spatial audio may include at least one of the following parameters: a direction index, a direct-to-total energy ratio; a spread coherence; an arrival time, gain and phase for each microphone; a diffuse-to-total energy ratio; a surround coherence; a remainder-to-total energy ratio; and a distance.

According to exemplary embodiments a metadata parameter of the second or first metadata parameters may indicate whether the created downmix audio signal is generated from: left right stereo signals, planar First Order Ambisonics (FOA) signals, or FOA component signals.

According to exemplary embodiments the representation of the spatial audio may contain metadata parameters organized into a definition field and a selector field, wherein the definition field specifies at least one delay compensation parameter set associated with the plurality of microphones, and the selector field specifying the selection of a delay compensation parameter set.

According to exemplary embodiments the selector field may specify what delay compensation parameter set applies to any given Time-Frequency tile.

According to exemplary embodiments the relative time delay value may be approximately in the interval of [−2.0 ms, 2.0 ms]

According to exemplary embodiments the metadata parameters in the representation of the spatial audio may further include a field specifying the applied gain adjustment and a field specifying the phase adjustment.

According to exemplary embodiments the gain adjustment may be approximately in the interval of [+10 dB, −30 dB].

According to exemplary embodiments at least parts of the first and/or second metadata elements are determined at the audio capturing device using stored lookup-tables.

According to exemplary embodiments at least parts of the first and/or second metadata elements are determined at a remote device connected to the audio capturing device.

II. Overview—System

According to a second aspect, there is provided a system for representing spatial audio.

According to exemplary embodiments there is provided a system for representing spatial audio, comprising:

- a receiving component configured to receive input audio signals from a plurality of microphones in an audio capture unit capturing the spatial audio;
- a downmixing component configured to create a single- or multi-channel downmix audio signal by downmixing the received audio signals;
- a metadata determination component configured to determine first metadata parameters associated with the downmix audio signal, wherein the first metadata parameters are indicative of one or more of: a relative time delay value, a gain value, and a phase value associated with each input audio signal; and
- a combination component configured to combine the created downmix audio signal and the first metadata parameters into a representation of the spatial audio.

III. Overview—Data format

According to a third aspect, there is provided data format for representing spatial audio. The data format may advantageously be used in conjunction with physical components relating to spatial audio, such as audio capturing devices, encoders, decoders, renderers, and so on, and various types of computer program products and other equipment that is used to transmit spatial audio between devices and/or locations.

According to example embodiments, the data format comprises:

- a downmix audio signal resulting from a downmix of input audio signals from a plurality of microphones in an audio capture unit capturing the spatial audio; and
- first metadata parameters indicative of one or more of: a downmix configuration for the input audio signals, a relative time delay value, a gain value, and a phase value associated with each input audio signal.

According to one example, the data format is stored in a non-transitory memory.

IV. Overview—Encoder

According to a fourth aspect, there is provided an encoder for encoding a representation of spatial audio.

According to exemplary embodiments there is provided an encoder configured to:

- receive a representation of spatial audio, the representation comprising:
  - a single- or multi-channel downmix audio signal created by downmixing input audio signals from a plurality of microphones in an audio capture unit capturing the spatial audio, and
  - first metadata parameters associated with the downmix audio signal, wherein the first metadata parameters are indicative of one or more of: a relative time delay value, a gain value, and a phase value associated with each input audio signal; and
- encode the single- or multi-channel downmix audio signal into a bitstream using the first metadata, or
- encode the single or multi-channel downmix audio signal and the first metadata into a bitstream.

V. Overview—Decoder

According to a fifth aspect, there is provided a decoder for decoding a representation of spatial audio.

According to exemplary embodiments there is provided a decoder configured to:

- receive a bitstream indicative of a coded representation of spatial audio, the representation comprising:
  - a single- or multi-channel downmix audio signal created by downmixing input audio signals from a plurality of microphones in an audio capture unit capturing the spatial audio, and
  - first metadata parameters associated with the downmix audio signal, wherein the first metadata parameters are indicative of one or more of: a relative time delay value, a gain value, and a phase value associated with each input audio signal; and
  - decode the bitstream into an approximation of the spatial audio, by using the first metadata parameters.

VI. Overview—Renderer

According to a sixth aspect, there is provided a renderer for rendering a representation of spatial audio.

According to exemplary embodiments there is provided a renderer configured to:

- receive a representation of spatial audio, the representation comprising:
  - a single- or multi-channel downmix audio signal created by downmixing input audio signals from a plurality of microphones in an audio capture unit capturing the spatial audio, and
  - first metadata parameters associated with the downmix audio signal, wherein the first metadata parameters are indicative of one or more of: a relative time delay value, a gain value, and a phase value associated with each input audio signal; and
  - render the spatial audio using the first metadata.

VII. Overview—Generally

The second to sixth aspect may generally have the same features and advantages as the first aspect.

Other objectives, features and advantages of the present invention will appear from the following detailed disclosure, from the attached dependent claims as well as from the drawings.

The steps of any method disclosed herein do not have to be performed in the exact order disclosed, unless explicitly stated.

VIII. Example Embodiments

As described above, capturing and representing spatial audio presents a specific set of challenges, such that the captured audio can be faithfully reproduced at the receiving end. The various embodiments of the present invention described herein address various aspects of these issues, by including various metadata parameters together with the downmix audio signal when transmitting the downmix audio signal.

The invention will be described by way of example, and with reference to the MASA audio format. However, it is important to realize that the general principles of the invention are applicable to a wide range of formats that may be used to represent audio, and the description herein is not limited to MASA.

Further, it should be realized that the metadata parameters that are described below are not a complete list of metadata parameters, but that there may be additional metadata parameters (or a smaller subset of metadata parameters) that can be used to convey data about the downmix audio signal to the various devices used in encoding, decoding and rendering the audio.

Also, while the examples herein will be described in the context of an IVAS encoder, it should be noted that this is merely one type of encoder in which the general principles of the invention can be applied, and that there may be many other types of encoders, decoders, and renderers that may be used in conjunction with the various embodiments described herein.

Lastly, it should be noted that while the terms "upmixing" and "downmixing" are used throughout this document, they may not necessarily imply increasing and reducing, respectively, the number of channels. While this may often be the case, it should be realized that either term can refer to either reducing or increasing the number of channels. Thus, both terms fall under the more general concept of "mixing." Similarly, the term "downmix audio signal" will be used throughout the specification, but it should be realized that occasionally other terms may be used, such as "MASA channel," "transport channel," or "downmix channel," all of which have essentially the same meaning as "downmix audio signal."

Figure 2:
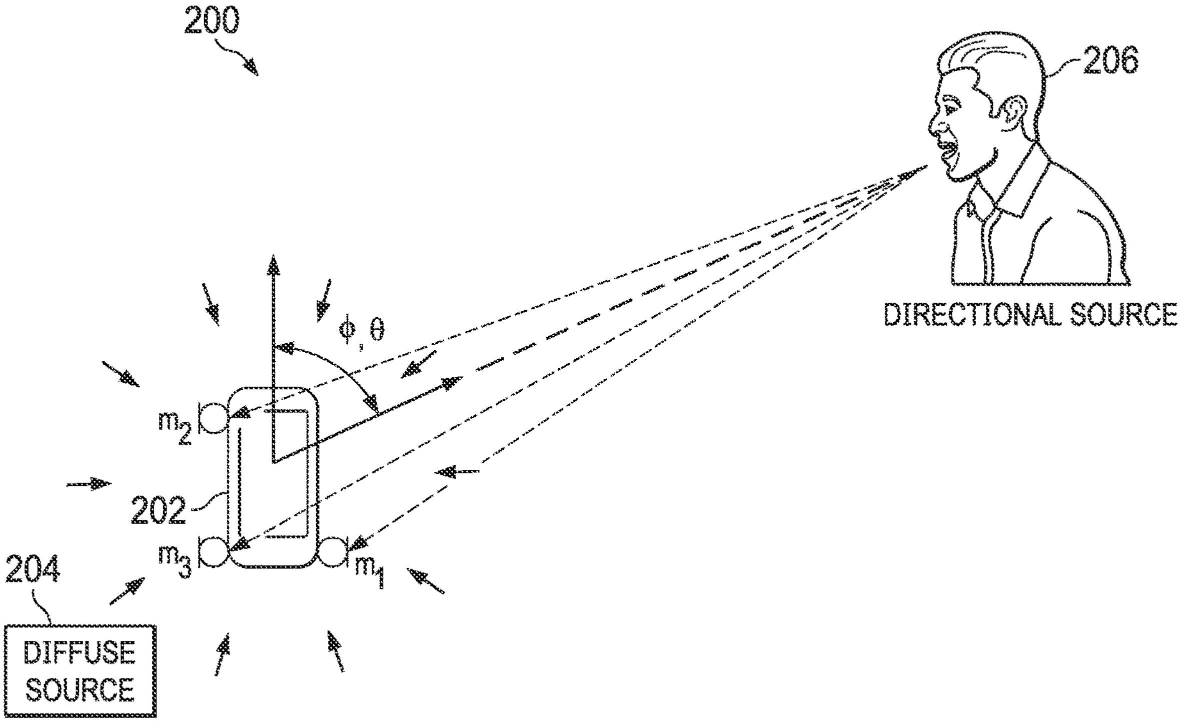
FIG. 2 is a schematic illustration of an audio capturing device and directional and diffuse sound sources, respectively, according to exemplary embodiments.

Turning now to FIG. 1, a method 100 is described for representing spatial audio, in accordance with one embodiment. As can be seen in FIG. 1, the method starts by capturing spatial audio using an audio capturing device, step 102. FIG. 2 shows a schematic view of a sound environment 200 in which an audio capturing device 202, such as a cell phone or tablet computer, for example, captures audio from a diffuse ambient source 204 and a directional source 206, such as a talker. In the illustrated embodiment, the audio capturing device 202 has three microphones m1, m2 and m3, respectively.

The directional sound is incident from a direction of arrival (DOA) represented by azimuth and elevation angles. The diffuse ambient sound is assumed to be omnidirectional, i.e., spatially invariant or spatially uniform. Also considered in the subsequent discussion is the potential occurrence of a second directional sound source, which is not shown in FIG. 2.

Next, the signals from the microphones are downmixed to create a single- or multi-channel downmix audio signal, step 104. There are many reasons to propagate only a mono downmix audio signal. For example, there may be bit rate limitations or the intent to make a high-quality mono downmix audio signal available after certain proprietary enhancements have been made, such as beamforming and equalization or noise suppression. In other embodiments, the downmix result in a multi-channel downmix audio signal. Generally, the number of channels in the downmix audio signal is lower than the number of input audio signals, however in some cases the number of channels in the downmix audio signal may be equal to the number of input audio signals and the downmix is rather to achieve an increased SNR, or reduce the amount of data in the resulting downmix audio signal compared to the input audio signals. This is further elaborated on below.

Propagating the relevant parameters used during the downmix to the IVAS codec as part of the MASA metadata may give the possibility to recover the stereo signal and/or a spatial downmix audio signal at best possible fidelity.

In this scenario, a single MASA channel is obtained by the following downmix operation:

$$x = D \cdot m, \text{ with}$$

$$D = (\kappa_{1,1} \quad \kappa_{1,2} \quad \kappa_{1,3}) \text{ and}$$

$$m = \begin{pmatrix} m_1 \\ m_2 \\ m_3 \end{pmatrix}.$$

The signals m and x may, during the various processing stages, not necessarily be represented as full-band time signals but possibly also as component signals of various sub-bands in the time or frequency domain (TF tiles). In that case, they would eventually be recombined and potentially be transformed to the time domain before being propagated to the IVAS codec.

Audio encoding/decoding systems typically divide the time-frequency space into time/frequency tiles, e.g., by applying suitable filter banks to the input audio signals. By a time/frequency tile is generally meant a portion of the time-frequency space corresponding to a time interval and a frequency band. The time interval may typically correspond to the duration of a time frame used in the audio encoding/decoding system. The frequency band is a part of the entire frequency range of the audio signal/object that is being encoded or decoded. The frequency band may typically correspond to one or several neighboring frequency bands defined by a filter bank used in the encoding/decoding system. In the case the frequency band corresponds to several neighboring frequency bands defined by the filter bank, this allows for having non-uniform frequency bands in the decoding process of the downmix audio signal, for example, wider frequency bands for higher frequencies of the downmix audio signal.

In an implementation using a single MASA channel, there are at least two choices as to how the downmix matrix D can be defined. One choice is to pick that microphone signal having best signal to noise ratio (SNR) with regards to the directional sound. In the configuration shown in FIG. 2 it is likely that microphone m1 captures the best signal as it is directed towards the directional sound source. The signals from the other microphones could then be discarded. In that case, the downmix matrix could be as follows:

$$D=(100).$$

While the sound source moves relative to the audio capturing device, another more suitable microphone could be selected so that either signal $m_2$ or $m_3$ is used as the resulting MASA channel.

When switching the microphone signals, it is important to make sure that the MASA channel signal x does not suffer from any potential discontinuities. Discontinuities could occur due to different arrival times of the directional sound source at the different mics, or due to different gain or phase characteristics of the acoustic path from the source to the mics. Consequently, the individual delay, gain and phase characteristics of the different microphone inputs must be analyzed and compensated for. The actual microphone signals may therefore undergo certain some delay adjustment and filtering operation before the MASA downmix.

In another embodiment, the coefficients of the downmix matrix are set such that the SNR of the MASA channel with regards to the directional source is maximized. This can be achieved, for example, by adding the different microphone signals with properly adjusted weights $\kappa_{1,1}$, $\kappa_{1,2}$, $\kappa_{1,3}$. To make this work in an effective way, individual delay, gain and phase characteristics of the different microphone inputs must again be analyzed and compensated, which could also be understood as acoustic beamforming towards the directional source.

The gain/phase adjustments may be understood as a frequency-selective filtering operation. As such, the corresponding adjustments may also be optimized to accomplish acoustic noise reduction or enhancement of the directional sound signals, for instance following a Wiener approach.

As a further variation, there may be an example with three MASA channels. In that case, the downmix matrix D can be defined by the following 3-by-3 matrix:

$$D=\begin{pmatrix}\kappa_{1,1} & \kappa_{1,2} & \kappa_{1,3}\\ \kappa_{2,1} & \kappa_{2,2} & \kappa_{2,3}\\ \kappa_{3,1} & \kappa_{2,2} & \kappa_{3,3}\end{pmatrix}$$

Consequently, there are now three signals $x_1$, $x_2$, $x_3$ (instead of one in the first example) that can be coded with the IVAS codec.

The first MASA channel may be generated as described in the first example. The second MASA channel can be used to carry a second directional sound, if there is one. The downmix matrix coefficients can then be selected according to similar principles as for the first MASA channel, however, such that the SNR of the second directional sound is maximized. The downmix matrix coefficients $\kappa_{3,1}$, $\kappa_{3,2}$, $\kappa_{3,3}$ for the third MASA channel may be adapted to extract the diffuse sound component while minimizing the directional sounds.

Typically, stereo capture of dominant directional sources in the presence of some ambient sound may be performed, as shown in FIG. 2 and described above. This may occur frequently in certain use cases, e.g. in telephony. In accordance with the various embodiments described herein, metadata parameters are also determined in conjunction with the downmixing, step 104, which will subsequently be added to and propagated along with the single mono downmix audio signal.

In one embodiment, three main metadata parameters are associated with each captured audio signal: a relative time delay value, a gain value and a phase value. In accordance with a general approach, the MASA channel is obtained according to the following operations:

Delay adjustment of each microphone signal $m_i$ (i=1, 2) by an amount $\tau_i=\Delta\tau_i+\tau_{ref}$.

Gain and phase adjustment of each Time Frequency (TF) component/tile of each delay adjusted microphone signal by a gain and a phase adjustment parameter, $\alpha$ and $\varphi$, respectively.

The delay adjustment term $\tau_i$ in the above expression can be interpreted as an arrival time of a plane sound wave from the direction of the directional source, and as such, it is also conveniently expressed as arrival time relative to the time of arrival of the sound wave at a reference point $\tau_{ref}$, such as the geometric center of the audio capturing device 202, although any reference point could be used. For example, when two microphones are used, the delay adjustment can be formulated as the difference between $\tau_1$, and $\tau_2$, which is equivalent to moving the reference point to the position of the second microphone. In one embodiment, the arrival time parameter allows modelling relative arrival times in an interval of [−2.0 ms, 2.0 ms], which corresponds to a maximum displacement of a microphone relative to the origin of about 68 cm.

As to the gain and phase adjustments, in one embodiment they are parameterized for each TF tile, such that gain changes can be modelled in the range [+10 dB, −30 dB], while phase changes can be represented in the range [−Pi, +Pi].

In the fundamental case with only a single dominant directional source, such as source 206 shown in FIG. 2, the delay adjustment is typically constant across the full frequency spectrum. As the position of the directional source 206 may change, the two delay adjustment parameters (one for each microphone) would vary over time. Thus, the delay adjustment parameters are signal dependent.

In a more complex case, where there may be multiple sources 206 of directional sound, one source from a first direction could be dominant in a certain frequency band, while a different source from another direction may be dominant in another frequency band. In such a scenario, the delay adjustment is instead advantageously carried out for each frequency band.

In one embodiment, this can be done by delay compensating microphone signals in a given Time-Frequency (TF) tile with respect to the sound direction that is found dominant. If no dominant sound direction is detected in the TF tile, no delay compensation is carried out.

In a different embodiment, the microphone signals in a given TF tile can be delay compensated with the goal of maximizing a signal-to-noise ratio (SNR) with respect to the directional sound, as captured by all the microphones.

In one embodiment, a suitable limit of different sources for which a delay compensation can be done is three. This offers the possibility to make delay compensation in a TF tile either with respect to one out of three dominant sources, or not at all. The corresponding set of delay compensation values (a set applies to all microphone signals) can thus be signaled by only two bits per TF tile. This covers most practically relevant capture scenarios and has the advantage that the amount of metadata or their bit rate remains low.

Another possible scenario is where First Order Ambisonics (FOA) signals rather than stereo signals are captured and downmixed into e.g. a single MASA channel. The concept of FOA is well known to those having ordinary skill in the art, but can be briefly described as a method for recording, mixing and playing back three-dimensional 360-degree audio. The basic approach of Ambisonics is to treat an audio scene as a full 360-degree sphere of sound coming from different directions around a center point where the microphone is placed while recording, or where the listener's 'sweet spot' is located while playing back.

Planar FOA and FOA capture with downmix to a single MASA channel are relatively straightforward extensions of the stereo capture case described above. The planar FOA case is characterized by a microphone triple, such as the one shown in FIG. 2, doing the capture prior to downmix. In the latter FOA case, capturing is done with four microphones, whose arrangement or directional selectivities extend into all three spatial dimensions.

The delay compensation, amplitude and phase adjustment parameters can be used to recover the three or, respectively, four original capture signals and to allow a more faithful spatial render using the MASA metadata than would be possible just based on the mono downmix signal. Alternatively, the delay compensation, amplitude and phase adjustment parameters can be used to generate a more accurate (planar) FOA representation that comes closer to the one that would have been captured with a regular microphone grid.

In yet another scenario, planar FOA or FOA may be captured and downmixed into two or more MASA channels. This case is an extension of the previous case with the difference that the captured three or four microphone signals are downmixed to two rather than only a single MASA channel. The same principles apply, where the purpose of providing delay compensation, amplitude and phase adjustment parameters is to enable best possible reconstruction of the original signals prior to the downmix.

As the skilled reader realizes, in order to accommodate all these use scenarios, the representation of the spatial audio will need to include metadata about not only the delay, gain and phase, but also parameters that are indicative of the downmix configuration for the downmix audio signal.

Returning now to FIG. 1, the determined metadata parameters are combined with the downmix audio signal into a representation of the spatial audio, step 108, which ends the process 100. The following is a description of how these metadata parameters can be represented in accordance with one embodiment of the invention.

To support the above described use cases with downmix to a single or multiple MASA channels, two metadata elements are used. One metadata element is signal independent configuration metadata that is indicative of the downmix. This metadata element is described below in conjunction with FIGS. 3A-3B. The other metadata element is associated with the downmix. This metadata element is described below in conjunction with FIGS. 4-6 and may be determined as described above in conjunction with FIG. 1. This element is required when downmix is signaled.

Table 1A, shown in FIG. 3A is a metadata structure can be used to indicate the number of MASA channels, from a single (mono) MASA channel, over two (stereo) MASA channels to a maximum of four MASA channels, represented by Channel Bit Values 00, 01, 10 and 11, respectively.

Table 1B, shown in FIG. 3B contains the channel bit values from Table 1A (in this particular case only channel values "00" and "01" are shown for illustrative purposes), and shows how the microphone capture configuration can be represented. For instance, as can be seen in Table 1B for a single (mono) MASA channel it can be signaled whether the capture configurations are mono, stereo, Planar FOA or FOA. As can further be seen in Table 1B, the microphone capture configuration is coded as a 2-bit field (in the column named Bit value). Table 1B also includes an additional description of the metadata. Further signal independent configuration may for instance represent that the audio originated from a microphone grid of a smartphone or a similar device.

In the case where the downmix metadata is signal dependent, some further details are needed, as will now be described. As indicated in Table 1B for the specific case when the transport signal is a mono signal obtained through downmix of multi-microphone signals, these details are provided in a signal dependent metadata field. The information provided in that metadata field describes the applied delay adjustment (with the possible purpose of acoustical beamforming towards directional sources) and filtering of the microphone signals (with the possible purpose of equalization/noise suppression) prior to the downmix. This offers additional information that can benefit encoding, decoding, and/or rendering.

In one embodiment, the downmix metadata comprises four fields, a definition and selector field for signaling the applied delay compensation, followed by two fields signaling the applied gain and phase adjustments, respectively.

The number of downmixed microphone signals n is signaled by the 'Bit value' field of Table 1B, i.e., n=2 for stereo downmix ('Bit value=01'), n=3 for planar FOA downmix ('Bit value=10') and n=4 for FOA downmix ('Bit value=11').

Up to three different sets of delay compensation values for the up to n microphone signals can be defined and signaled per TF tile. Each set is respective of the direction of a directional source. The definition of the sets of delay compensation values and the signaling which set applies to which TF tile is done with two separate (definition and selector) fields.

In one embodiment, the definition field is an n×3 matrix with 8-bit elements $B_{i,j}$ encoding the applied delay compensation $\Delta\tau_{i,j}$. These parameters are respective of the set to which they belong, i.e. respective of the direction of a directional source (j=1 . . . 3). The elements $B_{i,j}$ are further respective of the capturing microphone (or the associated capture signal) (i=1 . . . n, n≤4). This is schematically illustrated in Table 2, shown in FIG. 4.

FIG. 4 in conjunction with FIG. 3 thus shows an embodiment where representation of the spatial audio contains metadata parameters that are organized into a definition field and a selector field. The definition field specifies at least one delay compensation parameter set associated with the plurality of microphones, and the selector field specifies the selection of a delay compensation parameter set. Advantageously, the representation of the relative time delay value between the microphones is compact and thus requires less bitrate when transmitted to a subsequent encoder or similar.

The delay compensation parameter represents a relative arrival time of an assumed plane sound wave from the direction of a source compared to the wave's arrival at an (arbitrary) geometric center point of the audio capturing device 202. The coding of that parameter with the 8-bit integer code word B is done according to the following equation:

$$\Delta\tau = \frac{B-128}{128}\cdot 2\text{ ms.} \qquad \text{Equation No. (1)}$$

This quantizes the relative delay parameter linearly in an interval of [−2.0 ms, 2.0 ms], which corresponds to a maximum displacement of a microphone relative to the origin of about 68 cm. This is, of course, merely one example and other quantization characteristics and resolutions may also be considered.

The signaling of which set of delay compensation values applies to which TF tile is done using a selector field representing the 4*24 TF tiles in a 20 ms frame, which assumes 4 subframes in a 20 ms frame and 24 frequency bands. Each field element contains a 2-bit entry encoding set 1 . . . 3 of delay compensation values with the respective codes ‘01’, ‘10’, and ‘11’. A ‘00’ entry is used if no delay compensation applies for the TF tile. This is schematically illustrated in Table 3, shown in FIG. 5.

The Gain adjustment is signaled in 2-4 metadata fields, one for each microphone. Each field is a matrix of 8-bit gain adjustment codes $B_\alpha$, respective for the 4*24 TF tiles in a 20 ms frame. The coding of the gain adjustment parameters with the integer code word $B_\alpha$ is done according to the following equation:

$$a = \frac{B_a}{256} \cdot 40 - 30[\text{dB}]. \quad \text{Equation No. (2)}$$

Figures 6, 7:
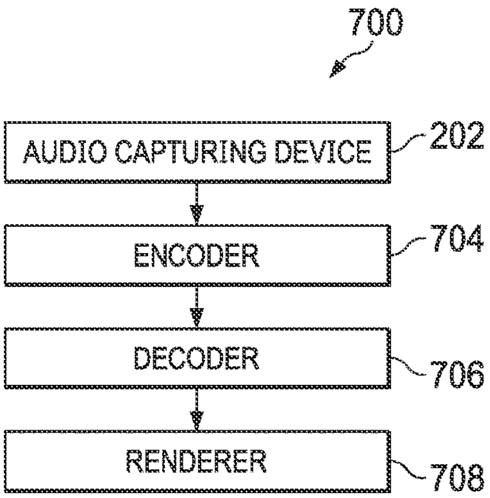
FIG. 6 shows a table (Table 4) of a metadata structure that can be used to represent gain adjustment for each microphone, according to exemplary embodiments.
FIG. 7 shows a system that includes an audio capturing device, an encoder, a decoder and a renderer, according to exemplary embodiments.

The 2-4 metadata fields for each microphone are organized as shown in the Table 4, shown in FIG. 6.

Phase adjustment is signaled analogous to gain adjustments in 2-4 metadata fields, one for each microphone. Each field is a matrix of 8-bit phase adjustment codes $B_\varphi$, respective for the 4*24 TF tiles in a 20 ms frame. The coding of the phase adjustment parameters with the integer code word $B_{100}$ done according to the following equation:

$$\varphi = \frac{B_\varphi}{256} \cdot 2\pi. \quad \text{Equation No. (3)}$$

The 2-4 metadata fields for each microphone are organized as shown in the table 4 with the only difference that the field elements are the phase adjustment code words $B_{100}$.

This representation of MASA signals, which include associated metadata can then be used by encoders, decoders, renderers and other types of audio equipment to be used to transmit, receive and faithfully restore the recorded spatial sound environment. The techniques for doing this are well-known by those having ordinary skill in the art, and can easily be adapted to fit the representation of spatial audio described herein. Therefore, no further discussion about these specific devices is deemed to be necessary in this context.

As understood by the skilled person, the metadata elements described above may reside or be determined in different ways. For example, the metadata may be determined locally on a device (such as an audio capturing device, an encoder device, etc.,), may be otherwise derived from other data (e.g. from a cloud or otherwise remote service), or may be stored in a table of predetermined values. For example, based on the delay adjustment between microphones, the delay compensation value (FIG. 4) for a microphone may be determined by a lookup-table stored at the audio capturing device, or received from a remote device based on a delay adjustment calculation made at the audio capturing device, or received from such a remote device based on a delay adjustment calculation performed at that remote device (i.e. based on the input signals).

FIG. 7 shows a system 700 in accordance with an exemplary embodiment, in which the above described features of the invention can be implemented. The system 700 includes an audio capturing device 202, an encoder 704, a decoder 706 and a renderer 708. The different components of the system 700 can communicate with each other through a wired or wireless connection, or any combination thereof, and data is typically sent between the units in the form of a bitstream. The audio capturing device 202 has been described above and in conjunction with FIG. 2, and is configured to capture spatial audio that is a combination of directional sound and diffuse sound. The audio capturing device 202 creates a single- or multi-channel downmix audio signal by downmixing input audio signals from a plurality of microphones in an audio capture unit capturing the spatial audio. Then the audio capturing device 202 determines first metadata parameters associated with the downmix audio signal. This will be further exemplified below in conjunction with FIG. 8. The first metadata parameters are indicative of a relative time delay value, a gain value, and/or a phase value associated with each input audio signal. The audio capturing device 202 finally combines the downmix audio signal and the first metadata parameters into a representation of the spatial audio. It should be noted that while in the current embodiment, all audio capturing and combining is done on the audio capturing device 202, there may also be alternative embodiments, in which certain portions of the creating, determining, and combining operations occur on the encoder 704.

The encoder 704 receives the representation of spatial audio from the audio capturing device 202. That is, the encoder 704 receives a data format comprising a single- or multi-channel downmix audio signal resulting from a downmix of input audio signals from a plurality of microphones in an audio capture unit capturing the spatial audio, and first metadata parameters indicative of a downmix configuration for the input audio signals, a relative time delay value, a gain value, and/or a phase value associated with each input audio signal. It should be noted that the data format may be stored in a non-transitory memory before/after being received by the encoder. The encoder 704 then encodes the single- or multi-channel downmix audio signal into a bitstream using the first metadata. In some embodiments, the encoder 704 can be an IVAS encoder, as described above, but as the skilled person realizes, other types of encoders 704 may have similar capabilities and also be possible to use.

The encoded bitstream, which is indicative of the coded representation of the spatial audio, is then received by the decoder 706. The decoder 706 decodes the bitstream into an approximation of the spatial audio, by using the metadata parameters that are included in the bitstream from the encoder 704. Finally, the renderer 708 receives the decoded representation of the spatial audio and renders the spatial audio using the metadata, to create a faithful reproduction of the spatial audio at the receiving end, for example by means of one or more speakers.

Figure 8:
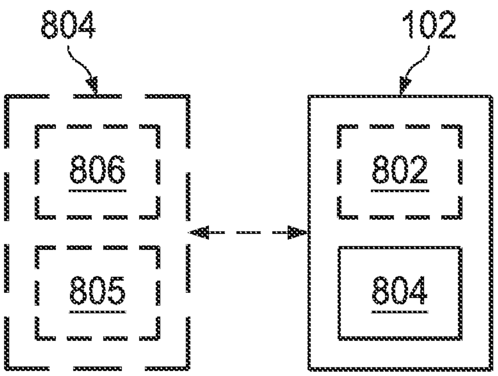
FIG. 8 shows an audio capturing device, according to exemplary embodiments.

FIG. 8 shows an audio capturing device 202 according to some embodiments. The audio capturing device 202 may in some embodiments comprise a memory 802 with stored look-up tables for determining the first and/or the second metadata. The audio capturing device 202 may in some embodiments be connected to a remote device 804 (which may be located in the cloud or be a physical device connected to the audio capturing device 202) which comprises a memory 806 with stored look-up tables for determining the first and/or the second metadata. The audio capturing device may in some embodiments do necessary calculations/processing (e.g. using a processor 803) for e.g. determining the relative time delay value, a gain value, and a phase value associated with each input audio signal and transmit such parameters to the remote device to receive the first and/or the second metadata from this device. In other embodiments, the audio capturing device 202 is transmitting the input signals to the remote device 804 which does the necessary calculations/processing (e.g. using a processor 805) and determines the first and/or the second metadata for transmission back to the audio capturing device 202. In yet another embodiment, the remote device 804 which does the necessary calculations/processing, transmit parameters back to the audio capturing device 202 which determines the first and/or the second metadata locally based on the received parameters (e.g. by use of the memory 806 with stored look-up tables).

Figure 9:
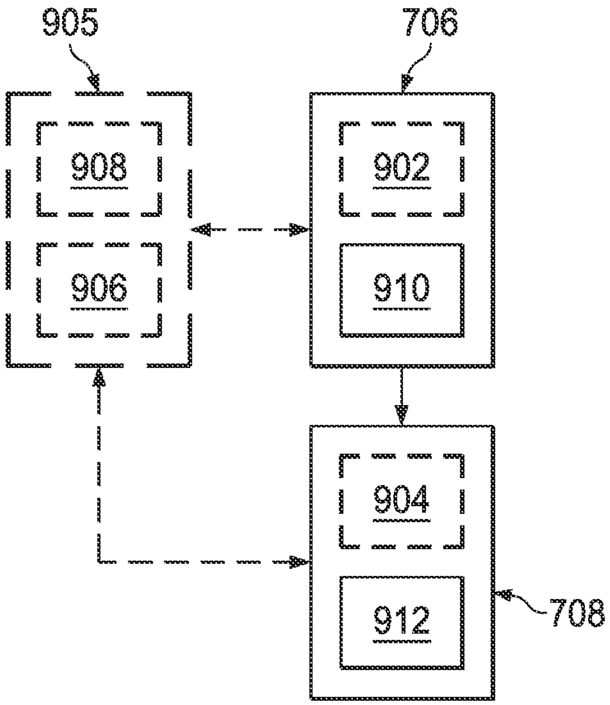
FIG. 9 shows a decoder and renderer, according to exemplary embodiments.

FIG. 9 shows a decoder 706 and renderer 708 (each comprising a processor 910, 912 for performing various processing, e.g. decoding, rendering, etc.,) according to embodiments. The decoder and renderer may be separate devices or in a same device. The processor(s) 910, 912 may be shared between the decoder and renderer or separate processors. Similar to what is described in conjunction with FIG. 8, the interpretation of the first and/or second metadata may be done using a look-up table stored either in a memory 902 at the decoder 706, a memory 904 at the renderer 708, or a memory 906 at a remote device 905 (comprising a processor 908) connected to either the decoder or the renderer.

Equivalents, Extensions, Alternatives and Miscellaneous

Further embodiments of the present disclosure will become apparent to a person skilled in the art after studying the description above. Even though the present description and drawings disclose embodiments and examples, the disclosure is not restricted to these specific examples. Numerous modifications and variations can be made without departing from the scope of the present disclosure, which is defined by the accompanying claims. Any reference signs appearing in the claims are not to be understood as limiting their scope.

Additionally, variations to the disclosed embodiments can be understood and effected by the skilled person in practicing the disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

All the figures are schematic and generally only show parts which are necessary in order to elucidate the disclosure, whereas other parts may be omitted or merely suggested. Unless otherwise indicated, like reference numerals refer to like parts in different figures.

The invention claimed is:

1. A method for generating an encoded bitstream representing a spatial audio signal, the spatial audio signal being a combination of directional sound and diffuse sound, the method comprising:

receiving a downmix audio signal comprising two channels, wherein a first channel of the downmix audio signal comprises a first directional sound component corresponding to a first direction, wherein a second channel of the downmix audio signal comprises a second directional sound component corresponding to a second direction, and wherein at least one of the first channel and the second channel further comprises a diffuse sound component;

receiving, for the first channel of the downmix audio signal:

a first direction index indicating a direction of arrival (DOA) of the first directional sound component, wherein the direction of arrival corresponds to a first azimuth angle and a first elevation angle;

a first direct-to-total energy ratio indicating a ratio of an energy of the first directional sound component to a total energy; and receiving, for the second channel of the downmix audio signal:

a second direction index indicating a direction of arrival (DOA) of the second directional sound component, wherein the direction of arrival corresponds to a second azimuth angle and a second elevation angle; and a second direct-to-total energy ratio indicating a ratio of an energy of the second directional sound component to the total energy;

receiving a diffuse-to-total energy ratio indicating a ratio of a diffuse sound energy to the total energy;

encoding the downmix audio signal into an encoded downmix audio signal; and combining the encoded downmix audio signal, the first direction index, the first direct-to-total energy ratio, the second direction index, the second direct-to-total energy ratio, and the diffuse-to-total energy ratio into an encoded bitstream.

2. The method of claim 1, wherein the first direction index, the first direct-to-total energy ratio, the second direction index, the second direct-to-total energy ratio, and the diffuse-to-total energy ratio are received for each of a plurality of frequency bands.

3. The method of claim 1, further comprising receiving a source format parameter and combining the source format parameter into the encoded bitstream.

4. The method of claim 3, wherein the source format parameter indicates that the downmix audio signal was derived from Ambisonics component signals.

5. The method of claim 3, wherein the source format parameter indicates that the downmix audio signal was derived from a left/right stereo component signals.

6. The method of claim 1, wherein the encoding is performed by an Enhanced Voice Services (EVS) or an Immersive Voice and Audio Services (IVAS) encoder.

7. An encoder comprising one or more processors configured to perform the method of claim 1.

8. A computer program product comprising a non-transitory computer-readable medium with instructions for performing the method of claim 1.

* * * * *